United States Patent [19]
Ueno

[11] Patent Number: 5,638,213
[45] Date of Patent: Jun. 10, 1997

[54] WIDE FIELD EYEPIECE

[75] Inventor: Yasunori Ueno, Kawasaki, Japan

[73] Assignee: Nikon Corporation, Tokyo, Japan

[21] Appl. No.: 459,315

[22] Filed: Jun. 2, 1995

[30] Foreign Application Priority Data

Sep. 7, 1994 [JP] Japan ................................. 6-239368

[51] Int. Cl.$^6$ ........................................... G02B 25/00
[52] U.S. Cl. ........................................ 359/643; 359/646
[58] Field of Search ................................ 359/643, 644, 359/645, 646

[56] References Cited

U.S. PATENT DOCUMENTS 4,747,675  5/1988  Nagler ................................. 359/643

FOREIGN PATENT DOCUMENTS

| 4013798 | 1/1991 | Germany ........................ 359/643 |
| 56-85723 | 7/1981 | Japan . |
| 1-197718 | 8/1989 | Japan . |
| 5-67005 | 9/1993 | Japan . |

Primary Examiner—Scott J. Sugarman
Assistant Examiner—Jordan M. Schwartz
Attorney, Agent, or Firm—Shapiro and Shapiro

[57] ABSTRACT

An eyepiece having an apparent field of view of 40° or greater which is provided, in succession from the eye point side, with a first lens unit G1 having positive refractive power as a whole, and a second lens unit G2 having negative refractive power as a whole and having a cemented negative lens disposed with a virtual image formed by the eyepiece interposed between itself and the first lens unit G1, satisfies the following conditions:

$$1.0 < f1/f < 2.0$$

$$-5.0 < f2/f < -2.5$$

$$1.5 < D/f < 3.0,$$

where f1 is the focal length of the first lens unit G1, f2 is the focal length of the second lens unit G2, D is the principal plane distance between the first lens unit G1 and the second lens unit G2, and f is the focal length of the entire lens system.

3 Claims, 4 Drawing Sheets

WIDE FIELD EYEPIECE

BACKGROUND OF THE INVENTION

1. Field of the Invention

This invention relates to a wide field eyepiece, and more particularly to an eyepiece having an apparent field of view of 40° or greater for use in a telescope, a microscope or the like.

2. Related Background Art

To make the observation of the whole field of view easily in an eyepiece, it is desirable that the on-axis interval between that lens surface of the eyepiece which is most adjacent to an eye and an eye point (hereinafter referred to as the "eye relief") be at least 80% of the focal length of the entire lens system. However, it is generally known that if the apparent field of view is made greater with the various aberrations of rays of light in the margin of field of view of the eyepiece kept constant, the eye relief will become smaller.

It is also known that if the eye relief is made greater, with the apparent field of view kept constant, the lens diameter of the eyepiece will be increased with a result that the various aberrations, particularly coma, astigmatism, chromatic difference of magnification and distortion, of rays of light in the margin of the field of view will be suddenly aggravated.

As described above, in the eyepiece according to the prior art, it has been difficult to correct various aberrations well to the margin of the field of view and yet secure both the field of view and the eye relief greatly.

SUMMARY OF THE INVENTION

The present invention has been made in view of the above-noted problem and has as an object thereof the provision of an eyepiece of which both the apparent field of view and the eye relief are great and in which various aberrations are corrected well to the margin of the field of view.

In order to solve the above-noted problem, according to the present invention, there is provided an eyepiece having an apparent field of view of 40° or greater which is provided, in succession from the eye point side, with a first lens unit G1 having positive refractive power as a whole, and a second lens unit G2 having negative refractive power as a whole and having a cemented negative lens disposed with a virtual image formed by the eyepiece interposed between itself and the first lens unit G1, characterized by satisfying the following conditions:

$$1.0 < f1/f < 2.0$$

$$-5.0 < f2/f < -2.5$$

$$1.5 < D/f < 3.0,$$

where f1 is the focal length of the first lens unit G1, f2 is the focal length of the second lens unit G2, D is the principal plane distance between the first lens unit G1 and the second lens unit G2, and f is the focal length of the entire lens system.

According to a preferred embodiment of the present invention, the first lens unit G1 has a cemented positive lens including a negative lens element, and satisfies the following conditions:

$$v1 < 40$$

$$40 < v2,$$

where $v1$ is the Abbe number of the negative lens element of the cemented positive lens of the first lens unit G1, and $v2$ is the Abbe number of the negative lens element of the cemented negative lens of the second lens unit G2.

Generally, in an eyepiece, it is very difficult as described above to obtain both large apparent field of view and large eye relief with various aberrations corrected well to the margin of the field of view. So, an attempt has been made to introduce an aspherical surface into a lens surface to thereby correct various aberrations and obtain both large apparent field of view and large eye relief. Certainly, by the introduction of an aspherical surface, it is possible to correct the sudden aggravation of the aberrations, particularly coma, astigmatism and distortion, of the rays of light in the margin of the field of view. However, there is no change in the fact that if the apparent field of view is made wide and the eye relief is made great, the lens diameter of the eyepiece will be increased. That is, according to the method of introducing an aspherical surface, it is necessary to make an aspherical lens of a large lens diameter accurately, and this is liable to lead to a higher cost.

In the present invention, in a construction having an apparent field of view of 40° or greater which is provided, in succession from the eye point side, with a first lens unit G1 having positive refractive power as a whole, and a second lens unit G2 having negative refractive power as a whole and having a cemented negative lens disposed with a virtual image formed by the eyepiece interposed between itself and the first lens unit G1, there have been found conditions for correcting various aberrations well to the margin of the field of view without introducing an aspherical surface, and yet obtaining both large apparent field of view and large eye relief.

The conditional expressions of the present invention will hereinafter be described.

The wide field eyepiece of the present invention satisfies the following conditional expressions (1) to (3):

$$1.0 < f1/f < 2.0 \quad (1)$$

$$-5.0 < f2/f < -2.5 \quad (2)$$

$$1.5 < D/f < 3.0, \quad (3)$$

where f: the focal length of the entire lens system;

f1: the focal length of the first lens unit G1;

f2: the focal length of the second lens unit G2;

D: the principal plane distance between the first lens unit G1 and the second lens unit G2.

Conditional expression (1) prescribes an appropriate range with regard to the focal length of the first lens unit G1.

If the upper limit value of conditional expression (1) is exceeded, the spacing between the first lens unit G1 and the second lens unit G2 will become great and the lens diameter of the second lens unit G2 will be increased, and this is not preferable.

If conversely, the lower limit value of conditional expression (1) is exceeded, not only distortion and astigmatism will increase, but also the eye relief will become short, and this is not preferable.

Conditional expression (2) prescribes an appropriate range with regard to the focal length of the second lens unit G2.

If the upper limit value of conditional expression (2) is exceeded, distortion and astigmatism will increase, and this is not preferable.

If conversely, the lower limit value of conditional expression (2) is exceeded, it will lead to an increase in the lens diameter of the second lens unit G2, and this is not preferable.

Conditional expression (3) prescribes an appropriate range with regard to the principal plane distance between the first lens unit G1 and the second lens unit G2.

If the upper limit value of conditional expression (3) is exceeded, the principal plane distance between the first lens unit G1 and the second lens unit G2 will become great and the focal length of the first lens unit G1 and the focal length of the second lens unit G2 will both become great, and this will lead to an increase in the lens diameters of the respective lens units and is therefore not preferable. If conversely, the lower limit value of conditional expression (3) is exceeded, the focal length of the first lens unit G1 and the focal length of the second lens unit G2 will both become small and distortion and astigmatism will increase, and this is not preferable.

Further, to correct chromatic aberration well, in addition to the above-described conditions, it is desirable that the first lens unit G1 have a cemented positive lens including a negative lens element and the following conditional expressions (4) and (5) be satisfied:

$$v1 < 40 \quad (4)$$

$$40 < v2, \quad (5)$$

where v1: the Abbe number of the negative lens element of the cemented positive lens of the first lens unit G1;

v2: the Abbe number of the negative lens component of the cemented negative lens of the second lens unit G2.

Conditional expression (4) prescribes an appropriate range with regard to the Abbe number v1 of the negative lens element of the cemented positive lens of the first lens unit G1.

Conditional expression (4) is a condition effective to correct chromatic aberration without reducing the radius of curvature of the cemented surface of the cemented positive lens of the lens components constituting the first lens unit G1, whereby it becomes possible to make the construction of the second lens unit G2 compact.

Conditional expression (5) prescribes an appropriate range with regard to the Abbe number v2 of the negative lens element of the cemented negative lens of the second lens unit G2.

Conditional expression (5) is a condition effective to correct chromatic aberration without reducing the radius of curvature of the cemented surface of the cemented negative lens of the lens components constituting the second lens unit G2.

If the lower limit value of conditional expression (5) is exceeded, the burden for the correction of chromatic aberration in the first lens unit G1 will become great, and this is not preferable. So, it is also possible to reduce the negative refractive power of the second lens unit G2 to thereby correct chromatic aberration, but in such case, the range of the above-mentioned conditional expression (2) is departed from, and this is inconvenient.

The above and other objects, features and advantages of the present invention will be explained hereinafter and may be better understood by reference to the drawings and the descriptive matter which follows.

DESCRIPTION OF THE PREFERRED EMBODIMENTS

The wide field eyepiece of the present invention, in each embodiment, is provided, in succession from the eye point side, with a first lens unit G1 having positive refractive power as a whole, and a second lens unit G2 having negative refractive power as a whole and having a cemented negative lens disposed with a virtual image formed by the eyepiece interposed between itself and the first lens unit G1.

Each embodiment of the present invention will hereinafter be described with reference to the accompanying drawings.

[Embodiment 1]

Figure 1:
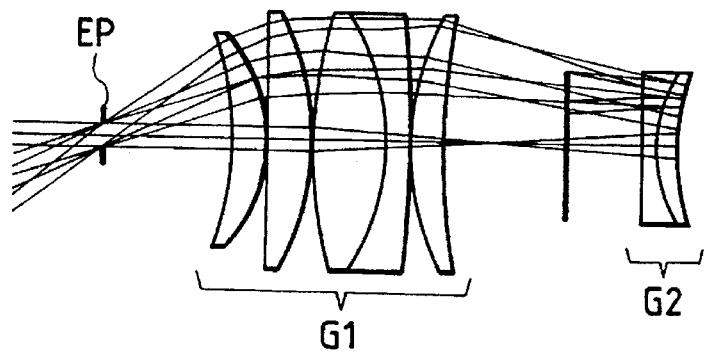
FIG. 1 shows the lens construction of a wide field eyepiece according to a first embodiment of the present invention.

FIG. 1 shows the lens construction of a wide field eyepiece according to a first embodiment of the present invention.

The wide field eyepiece shown in FIG. 1 is comprised, in succession from the eye point side, of a first lens unit G1 comprising a positive meniscus lens having its concave surface facing the eye point side, a biconvex lens, a cemented positive lens consisting of a biconvex lens and a negative meniscus lens having its concave surface facing the eye point side, and a positive meniscus lens having its convex surface facing the eye point side, and a second lens unit G2 comprising a cemented negative lens consisting of a biconcave lens and a positive meniscus lens having its convex surface facing the eye point side. In FIG. 1, EP designates the eye point.

The numerical values of Embodiment 1 of the present invention are given in Table 1 below. In Table 1, the numbers at the left end indicate the order of the respective lens surfaces from the object side (eye point side), r indicates the radius of curvature of each lens surface, d indicates the spacing between adjacent lens surfaces, and n and v indicate refractive indices and Abbe numbers, respectively, for d-line ($\lambda = 587.6$ nm).

TABLE 1

| Focal length of entire lens system f = 12 mm Apparent field of view 80° Eye relief 15.1 mm | | | |
|---|---|---|---|
| r | d | n | v |
| 1  −30.159 | 3.5 | 1.6204 | 60.1 |
| 2  −16.987 | 0.2 | | |
| 3  579.750 | 5.1 | 1.6204 | 60.1 |
| 4  −29.161 | 0.2 | | |
| 5  49.681 | 9.0 | 1.6204 | 60.1 |
| 6  −21.365 | 2.0 | 1.8052 | 25.3 |
| 7  −259.182 | 0.2 | | |
| 8  27.845 | 4.2 | 1.7130 | 53.9 |
| 9  101.559 | 23.206 | | |
| 10  −169.503 | 1.5 | 1.5168 | 64.1 |
| 11  13.040 | 2.5 | 1.7552 | 27.6 |
| 12  20.994 | −12.739 | | |

TABLE 1-continued

Focal length of entire lens system f = 12 mm
Apparent field of view 80°
Eye relief 15.1 mm (Condition-corresponding values)

f = 12
f1 = 16.522
f2 = −49.978
D = 35.352
(1) f1/f = 1.377
(2) f2/f = −4.165
(3) D/f = 2.946
(4) ν1 = 25.3
(5) ν2 = 64.1

Figure 2:
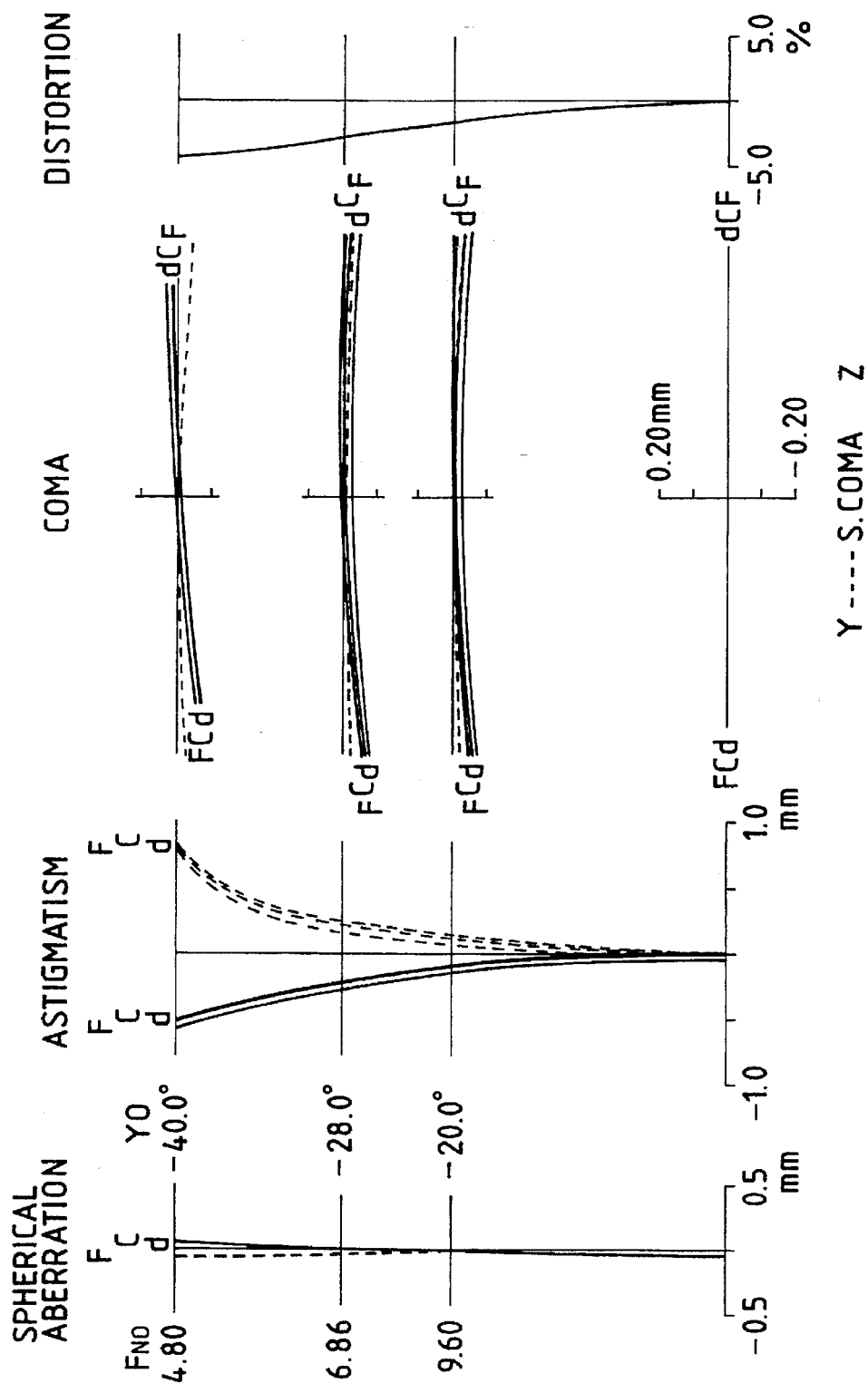
FIG. 2 shows the aberrations of the first embodiment.

Referring to FIG. 2 which shows the aberrations of Embodiment b 1,the aberrations are those when rays of light are pursued from the eye point side.

In FIG. 2, FNO indicates F-numbers, Y0 indicates the half field (unit being °) of the apparent field of view, d indicates d-line ($\lambda$=587.6 nm), C indicates C-line ($\lambda$=656.3 nm) and F indicates F-line ($\lambda$=486.1 nm).

In the aberration graph showing astigmatism, the solid line indicates the sagittal image plane and the broken line indicates the meridional image plane. Also, in the aberration graph showing spherical aberration, the broken line indicates the sine condition. Further, in the aberration graph showing coma, the broken line indicates the coma of the sagittal plane.

As is apparent from each aberration graph, it is seen that in the present embodiment, a wide field of view (an apparent field of view 80°) is obtained and the eye relief longer than the focal length of the entire lens system is obtained, and yet the various aberrations are corrected well to the margin of the field of view.

Specifically, the eye relief has a length of about 126% of the focal length of the entire lens system. Also, distortion is suppressed to about 3 to 4% even in the margin of the field of view.

[Embodiment 2]

Figure 3:
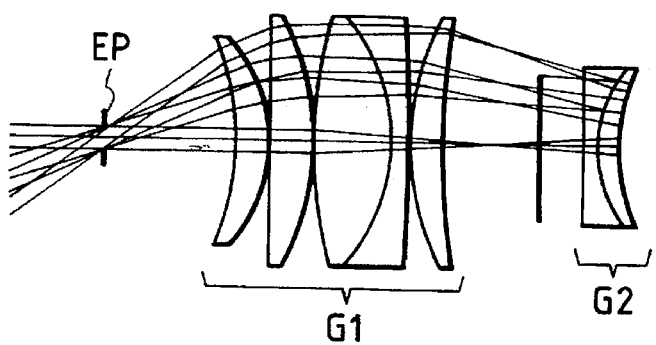
FIG. 3 shows the lens construction of a wide field eyepiece according to a second embodiment of the present invention.

FIG. 3 shows the lens construction of a wide field eyepiece according to a second embodiment of the present invention.

The wide field eyepiece shown in FIG. 3 is comprised, in succession from the eye point side, of a first lens unit G1 comprising a positive meniscus lens having its concave surface facing the eye point side, a biconvex lens, a cemented positive lens consisting of a biconvex lens and a negative meniscus lens having its concave surface facing the eye point side, and a positive meniscus lens having its convex surface facing the eye point side, and a second lens unit G2 comprising a cemented negative lens consisting of a biconcave lens and a positive meniscus lens having its convex surface facing the eye point side. In FIG. 3, EP designates the eye point.

The numerical values of Embodiment 2 of the present invention are given in Table 2 below. In Table 2, the numbers at the left end indicate the order of the respective lens surfaces from the object side (eye point side), r indicates the radius of curvature of each lens surface, d indicates the spacing between adjacent lens surfaces, and n and ν indicate refractive indices and Abbe numbers, respectively, for d-line ($\lambda$=587.6 nm).

TABLE 2

Focal length of entire lens system f = 12 mm
Apparent field of view 80°
Eye relief 14.9 mm

| | r | d | n | ν |
| --- | --- | --- | --- | --- |
| 1 | −28.585 | 3.5 | 1.6204 | 60.1 |
| 2 | −16.000 | 0.2 | | |
| 3 | 546.062 | 5.0 | 1.6204 | 60.1 |
| 4 | −27.467 | 0.2 | | |
| 5 | 46.794 | 9.0 | 1.6204 | 60.1 |
| 6 | −20.124 | 2.0 | 1.8052 | 25.3 |
| 7 | −244.122 | 0.2 | | |
| 8 | 26.227 | 4.0 | 1.7130 | 53.9 |
| 9 | 110.000 | 16.587 | | |
| 10 | −189.445 | 1.5 | 1.5168 | 64.1 |
| 11 | 12.100 | 2.5 | 1.7552 | 27.6 |
| 12 | 18.826 | −9.191 | | |

(Condition-corresponding values)

f = 12
f1 = 15.500
f2 = −45.000
D = 28.625
(1) f1/f = 1.292
(2) f2/f = −3.750
(3) D/f = 2.385
(4) ν1 = 25.3
(5) ν2 = 64.1

Figure 4:
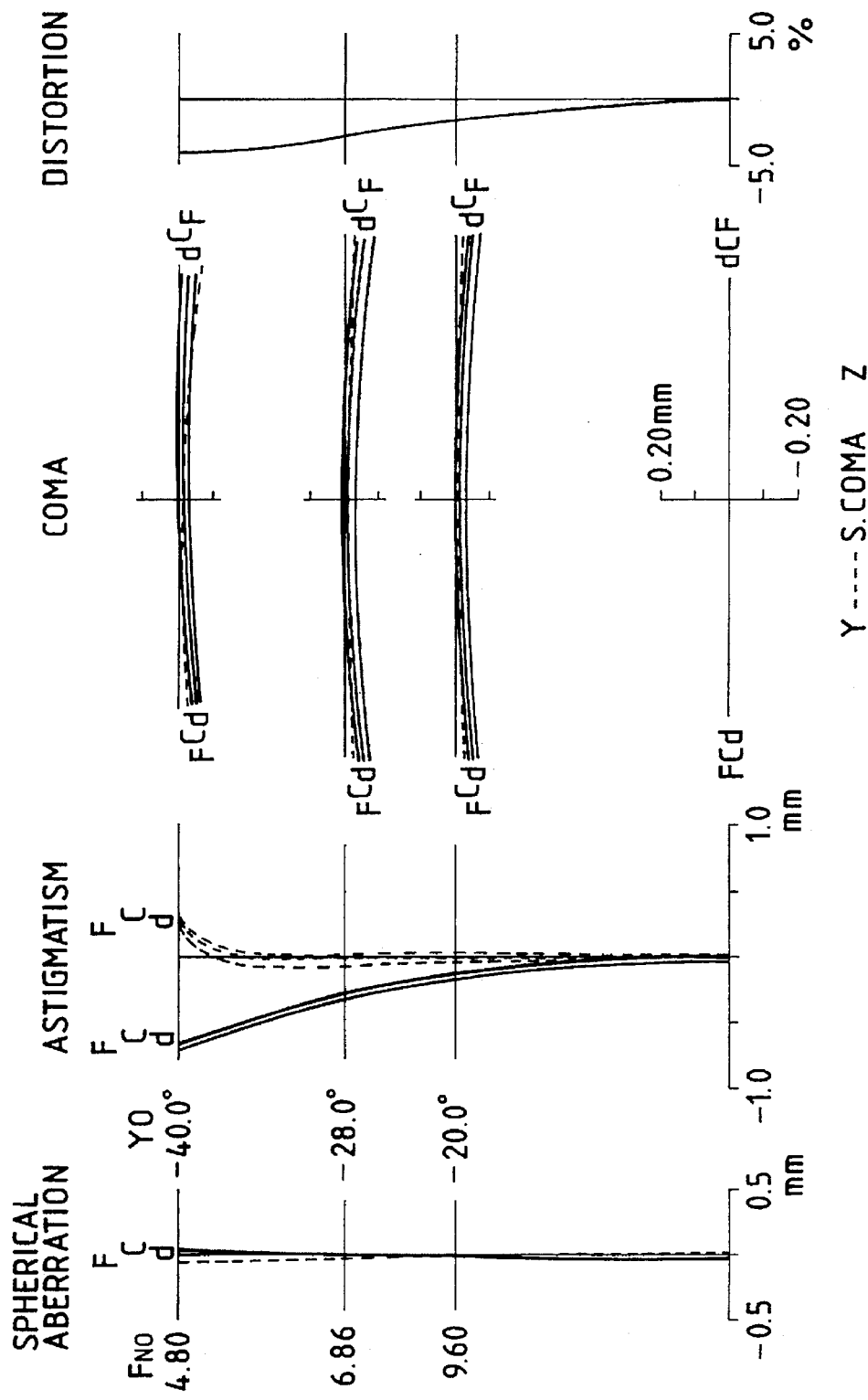
FIG. 4 shows the aberrations of the second embodiment.

Referring to FIG. 4 which shows the aberrations of Embodiment 2, the aberrations are those when rays of light are pursued from the eye point side.

In FIG. 4, FNO indicates F-numbers, Y0 indicates the half field (unit being °) of the apparent field of view, d indicates d-line ($\lambda$=587.6 nm), C indicates C-line ($\lambda$=656.3 nm) and F indicates F-line ($\lambda$=486.1 nm).

In the aberration graph showing astigmatism, the solid line indicates the sagittal image plane, and the broken line indicates the meridional image plane. Also, in the aberration graph showing spherical aberration, the broken line indicates the sine condition. Further, in the aberration graph showing coma, the broken line indicates the coma of the sagittal plane.

As is apparent from each aberration graph, it is seen that in the present embodiment, a wide field of view (an apparent field of view 80°) is obtained and the eye relief longer than the focal length of the entire lens system is obtained, and yet the various aberrations are corrected well to the margin of the field of view.

Specifically, the eye relief has a length of about 124% of the focal length of the entire lens system. Also, distortion is suppressed to about 3 to 4% even in the margin of the field of view.

[Embodiment 3]

Figure 5:
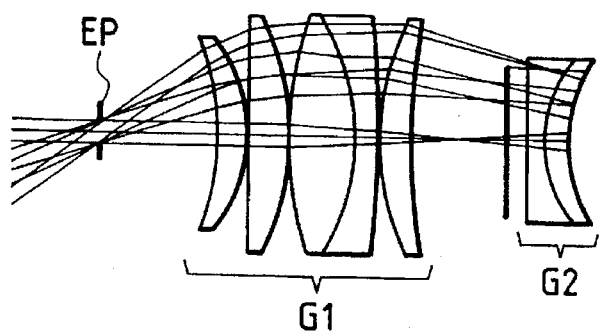
FIG. 5 shows the lens construction of a wide field eyepiece according to a third embodiment of the present invention.

FIG. 5 shows the lens construction of a wide field eyepiece according to a third embodiment of the present invention.

The wide field eyepiece shown in FIG. 5 is comprised, in succession from the eye point side, of a first lens unit G1 comprising a positive meniscus lens having its concave surface facing the eye point side, a biconvex lens, a cemented positive lens consisting of a biconvex lens and a negative meniscus lens having its concave surface facing the eye point side, and a positive meniscus lens having its convex surface facing the eye point side, and a second lens unit G2 comprising a cemented negative lens consisting of a biconcave lens and a positive meniscus lens having its convex surface having the eye point side. In FIG. 5, EP designates the eye point.

The numerical values of Embodiment 3 of the present invention are given in Table 3 below. In Table 3, the numbers at the left end indicate the order of the respective lens surfaces from the object side (eye point side), r indicates the radius of curvature of each lens surface, d indicates the spacing between adjacent lens surfaces, and n and ν indicate refractive indices and Abbe numbers, respectively, for d-line (λ=587.6 nm).

TABLE 3

Focal length of entire lens system f = 12 mm
Apparent field of view 80°
Eye relief 13.6 mm

|    | r        | d      | n      | ν    |
|----|----------|--------|--------|------|
| 1  | −27.201  | 3.1    | 1.6204 | 60.1 |
| 2  | −15.609  | 0.2    |        |      |
| 3  | 532.730  | 4.7    | 1.6204 | 60.1 |
| 4  | −26.796  | 0.2    |        |      |
| 5  | 45.652   | 7.8    | 1.6204 | 60.1 |
| 6  | −20.668  | 2.0    | 1.8052 | 25.3 |
| 7  | −238.161 | 0.2    |        |      |
| 8  | 25.204   | 4.0    | 1.7130 | 53.9 |
| 9  | 106.866  | 13.836 |        |      |
| 10 | −110.135 | 1.5    | 1.5168 | 64.1 |
| 11 | 11.425   | 3.2    | 1.7552 | 27.6 |
| 12 | 18.500   | −7.437 |        |      |

(Condition-corresponding values)

f = 12
f1 = 15.000
f2 = −42.500
D = 25.625
(1) f1/f = 1.250
(2) f2/f = −3.542
(3) D/f = 2.135
(4) ν1 = 25.3
(5) ν2 = 64.1

Figure 6:
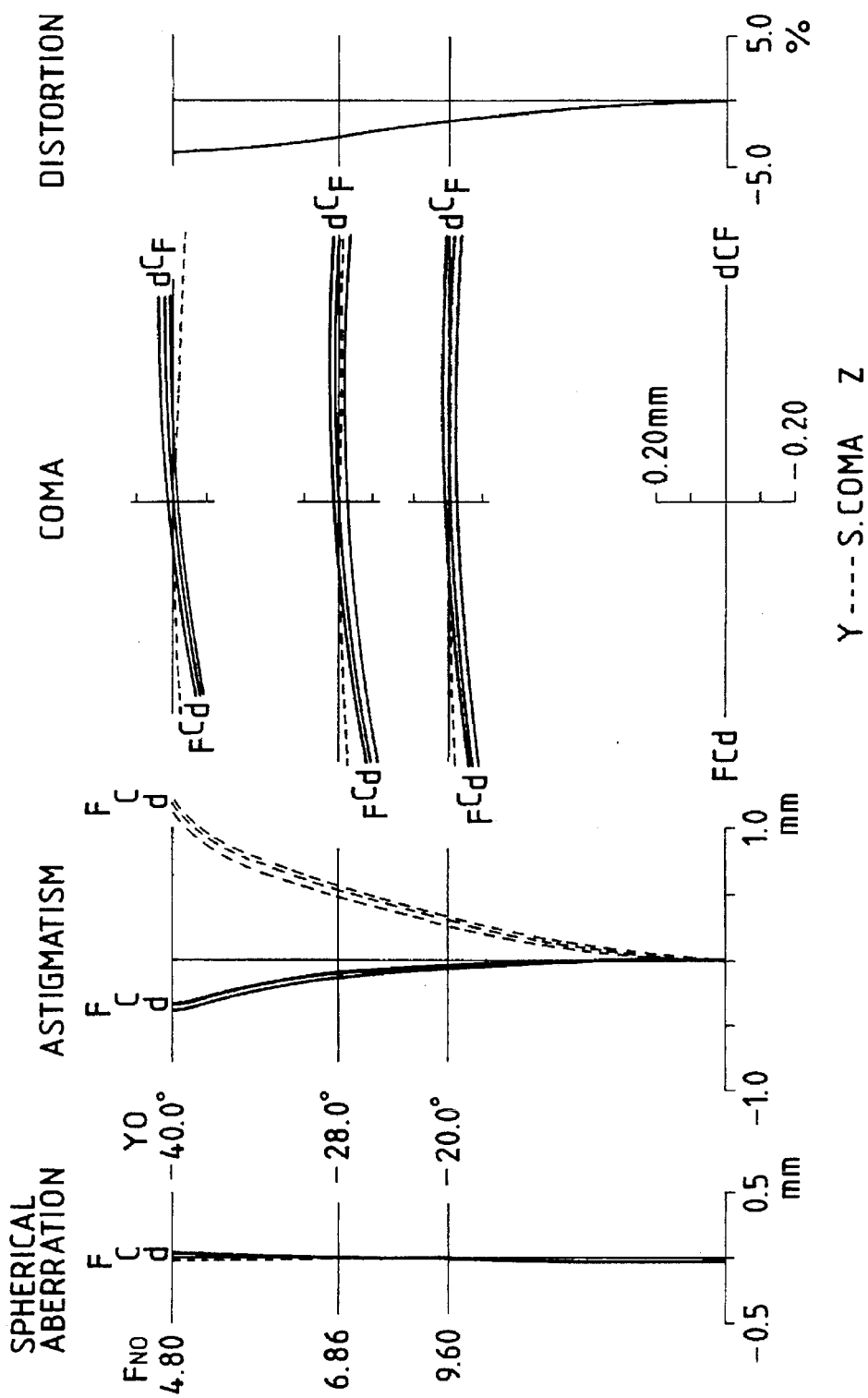
FIG. 6 shows the aberrations of the third embodiment.

Referring to FIG. 6 which shows the aberrations of Embodiment 3, the aberrations are those when rays of light are pursued from the eye point side.

In FIG. 6, FNO indicates F-numbers, Y0 indicates the half field (unit being °) of the apparent field of view, d indicates d-line (λ=587.6 nm), C indicates C-line (λ=656.3 nm) and F indicates F-line (λ=486.1 nm).

In the aberration graph showing astigmatism, the solid line indicates the sagittal image plane and the broken line indicates the meridional image plane. Also, in the aberration graph showing spherical aberration, the broken line indicates the sine condition. Further, in the aberration graph showing coma, the broken line indicates the coma of the sagittal plane.

As is apparent from each aberration graph, it is seen that in the present embodiment, a wide field of view (an apparent field of view 80°) is obtained and the eye relief longer than the focal length of the entire lens system is obtained, and yet the various aberrations are corrected well to the margin of the field of view.

Specifically, the eye relief has a length of about 113% of the focal length of the entire lens system. Also, distortion is suppressed to about 3 to 4% even in the margin of the field of view.

Having described preferred embodiments of the present invention, it is to be understood that any variations will occur to those skilled in the art within the scope of the appended claims.

What is claimed is:

1. An eyepiece having an apparent field of view of 80° or greater, which comprises, in succession from the eye point side, a first lens unit having positive refractive power as a whole and a second lens unit having negative refractive power as a whole, said first lens unit having, in succession from the eye point side, a positive meniscus lens having its concave surface facing the eye point side, a biconvex lens, a cemented positive lens consisting of a biconvex lens and a negative meniscus lens having its concave surface facing the eye point side, and a positive meniscus lens having its convex surface facing the eye point side, said second lens unit having a cemented negative lens, a virtual image formed by said eyepiece being interposed between said first lens unit and said second lens unit, the eyepiece satisfying the following conditions:

1.0<f1/f<2.0

−5.0<f2/f<−2.5

1.5<D/f<3.0, where f1 is the focal length of said first lens unit, f2 is the focal length of said second lens unit, D is the principal plane distance between said first lens unit and said second lens unit, and f is the focal length of the entire lens system.

2. An eyepiece according to claim 1, wherein the following conditions are satisfied:

ν1<40

40<ν2, where ν1 is the Abbe number of said negative meniscus lens of the cemented positive lens of said first lens unit, and ν2 is the Abbe number of a negative lens element of said cemented negative lens of said second lens unit.

3. An eyepiece according to claim 1, wherein said cemented negative lens consists of a biconcave lens and a positive meniscus lens having its convex surface facing the eye point side.

* * * * *